(12) United States Patent
Kawachi et al.

(10) Patent No.: US 8,857,800 B2
(45) Date of Patent: Oct. 14, 2014

(54) TANK RUBBER CUSHION

(75) Inventors: Yuya Kawachi, Aichi (JP); Hideki Maehashi, Aichi (JP); Takashi Furusawa, Aichi (JP); Jun Kobayashi, Aichi (JP)

(73) Assignees: Tokai Rubber Industries, Ltd., Aichi (JP); Toyota Jidosha Kabushiki Kaisha, Aichi (JP)

( * ) Notice: Subject to any disclaimer, the term of this patent is extended or adjusted under 35 U.S.C. 154(b) by 12 days.

(21) Appl. No.: 13/607,003

(22) Filed: Sep. 7, 2012

(65) Prior Publication Data

US 2012/0326369 A1    Dec. 27, 2012

Related U.S. Application Data

(63) Continuation of application No. PCT/JP2011/005705, filed on Oct. 12, 2011.

(30) Foreign Application Priority Data

Oct. 29, 2010   (JP) .................................. 2010-243546

(51) Int. Cl.
*F16F 7/00* (2006.01)
*B60K 15/067* (2006.01)
*F16M 1/00* (2006.01)

(52) U.S. Cl.
CPC .................................. *B60K 15/067* (2013.01)
USPC .................... 267/141.3; 267/141.7; 267/153; 267/294

(58) Field of Classification Search
USPC ................. 267/140.11, 140.12, 141.2, 141.3, 267/141.4, 141.5, 141.7, 293, 153, 294; 248/560, 562, 604, 636, 638
See application file for complete search history.

(56) References Cited

U.S. PATENT DOCUMENTS 2,144,170 A * 1/1939 Utz et al. ...................... 296/35.1
2,726,081 A * 12/1955 Hunter .......................... 267/293

(Continued)

FOREIGN PATENT DOCUMENTS

CN    101799054    8/2010
JP    47-30714     9/1972

(Continued)

OTHER PUBLICATIONS

Japanese Office Action and English language translation, mail date is Oct. 5, 2012.

(Continued)

*Primary Examiner* — Melody Burch
(74) *Attorney, Agent, or Firm* — Greenblum & Bernstein, P.L.C.

(57) ABSTRACT

A tank rubber cushion for providing a vibration-damping support of a fuel tank against a vehicle body, including two divided rubber cylinders inserted onto an inner axial member having flanges at both axial ends and to be inserted through a mounting hole formed in a support portion of the fuel tank. Each of the divided rubber cylinders is provided with an axial vibration-damping rubber portion arranged between opposing surfaces of the flange of the inner axial member and the support portion in an axial direction, and a transaxial vibration-damping rubber portion arranged between opposing surfaces of the inner axial member and the support portion in a transaxial direction. The transaxial vibration-damping rubber portion includes a concave/convex portion wherein a diameter varies in a circumferential direction so that an assembly can be made with a gap between the inner axial member and the support portion.

7 Claims, 5 Drawing Sheets

(56) References Cited

U.S. PATENT DOCUMENTS

| | | | | |
|---|---|---|---|---|
| 2,936,141 A * | 5/1960 | Rapata | | 248/604 |
| 4,286,777 A * | 9/1981 | Brown | | 267/294 |
| 6,065,742 A * | 5/2000 | Whiteford | | 267/140.5 |
| 6,164,405 A * | 12/2000 | Sakata | | 180/400 |
| 7,052,183 B2 * | 5/2006 | Chen et al. | | 384/536 |
| 7,070,157 B2 * | 7/2006 | Huprikar et al. | | 248/636 |
| 7,748,689 B2 * | 7/2010 | Thibault et al. | | 267/140.12 |
| 2009/0077785 A1 | 3/2009 | Kaneyasu et al. | | |
| 2010/0199800 A1 * | 8/2010 | Horie et al. | | 74/513 |

FOREIGN PATENT DOCUMENTS

| | | |
|---|---|---|
| JP | 62-77346 | 5/1987 |
| JP | 63-6254 | 1/1988 |
| JP | 6-75848 | 10/1994 |
| JP | 2003-261082 | 9/2003 |
| JP | 2006-192947 | 7/2006 |
| JP | 2007-314072 | 12/2007 |
| JP | 2008-173990 | 7/2008 |

OTHER PUBLICATIONS

International Search Report, mail date is Jan. 24, 2012.

International Preliminary Report on Patentability and English translation for PCT/JP2011/005705, mailed May 14, 2013.

Korea Office action, dated Feb. 15, 2014 along with an english translation thereof.

China Office action, dated May 5, 2014 along with an english translation thereof.

* cited by examiner

TANK RUBBER CUSHION

INCORPORATED BY REFERENCE

The disclosure of Japanese Patent Application No. 2010-243546 filed on Oct. 29, 2010 including the specification, drawings and abstract is incorporated herein by reference in its entirety. This is a Continuation of International Application No. PCT/JP2011/005705 filed on Oct. 12, 2011.

BACKGROUND OF THE INVENTION

1. Field of the Invention

The present invention relates to a tank rubber cushion for providing a vibration-damping support of a fuel tank against a vehicular body.

2. Description of the Related Art

Tank rubber cushions have conventionally been used in order to let a fuel tank be supported by the vehicular body. One such example is the one described in U.S. Publication No. US 2009/0077785.

Meanwhile, a tank rubber cushion is required to have a vibration-damping performance so as to achieve stable supplies of fuel into the tank and reduce transmission of vibration to the vehicular body caused by a displacement of the fuel tank, and is also required to attenuate flow noise within the fuel tank. In order to meet these requirements, it is considered effective for a tank rubber cushion to sustain enough rigidity of the support spring in the vertical direction, and at the same time, to be provided with low spring characteristics in the horizontal direction.

However, the tank rubber cushion of conventional structure described in US 2009/0077785 utilizes the spring characteristics associated with compression deformation of a rubber elastic body in both vertical and horizontal directions, although the spring characteristics are adjusted by the provision of elastic protrusions. Therefore, it was difficult for the tank rubber cushion of US 2009/0077785 to meet the intended spring characteristics in either vertical or horizontal direction.

SUMMARY OF THE INVENTION

It is therefore one object of this invention to provide a tank rubber cushion with a novel structure that can achieve provision of rigidity of the support spring large enough in the vertical direction and low spring characteristics in the horizontal direction without any structural complication or increase in the number of components.

A first mode of the present invention is a tank rubber cushion for providing a vibration-damping support of a fuel tank at multiple locations against a vehicle body, comprising: an inner axial member adapted to be fixed to one of the fuel tank and the vehicle body, the inner axial member having flanges at both ends in an axial direction, respectively, and the inner axial member being adapted to be inserted through a mounting hole formed in a support portion provided to another of the fuel tank and the vehicle body, with the flanges of the inner axial member being placed at and facing to both sides of the support portion in the axial direction; two divided rubber cylinders inserted onto an outer peripheral face of the inner axial member while facing each other in the axial direction; an axial vibration-damping rubber portion in an annular form being provided on an axially outside portion of each of the divided rubber cylinders, and being arranged between opposing surfaces of the flange of the inner axial member and the support portion in the axial direction; and a transaxial vibration-damping rubber portion in a cylinder form being provided to an axially inside portion of each of the divided rubber cylinders, and being thrust into the mounting hole of the support portion from both sides in the axial direction so as to be arranged between opposing surfaces of the inner axial member and the support portion in a transaxial direction, wherein the transaxial vibration-damping rubber portion of each divided rubber cylinder includes a concave/convex portion wherein a diameter varies in a circumferential direction so that an assembly can be made with a gap between an outer periphery of the inner axial member and an inner periphery of the support portion along the concave/convex portion.

In the tank rubber cushion according to the structure of the first mode of the present invention, the axial vibration-damping rubber portions of the divided rubber cylinders are tucked between the flanges so that a compression spring component gives a dominant effect to the divided rubber cylinder in the axial direction. Therefore, by installing the tank rubber cushion of the present mode with its axis in the vertical direction, a hard spring is easily set up to exert high attenuation effects against vertical vibrations inputted between the fuel tank and vehicle body. Moreover, movement of fuel in the fuel tank due to displacement thereof is restricted, which stably supplies fuel to the engine. In addition, since compression deformation becomes prominent in the divided rubber cylinder in the axial direction, load bearing capacity of the divided rubber cylinder is favorably secured to improve the durability thereof.

Meanwhile, the concave/convex portions is provided to the transaxial vibration-damping rubber portion of the divided rubber cylinder to form a gap with the inner axial member in the transaxial direction, while another gap is provided with the support portion in the transaxial direction under installation to the vehicle body. This allows the shearing component of the spring to act effectively to readily realize a comparatively soft spring by having the concave/convex portion of the transaxial vibration-damping rubber portion deformed expansively (flattened) at the time of vibration input in the transaxial direction. As a result, flow noise of the fuel contained in the fuel tank is prevented from being transmitted to the side of the vehicle body, thus improving the quietness in the car.

The tank rubber cushion of the present aspect is made in a simple structure where the two divided rubber cylinders are attached to an inner axial member provided with a pair of flanges limiting the number of parts. Therefore, it contributes to easier manufacturing as well as downsizing and weight reduction of the vehicle.

A second mode of the present invention is the tank rubber cushion according to the first mode, wherein the transaxial vibration-damping rubber portions of the two divided rubber cylinders are abutted against each other at respective end surfaces in the axial direction.

According to the second mode, in addition to the compression spring of the axial vibration-damping rubber portion in the axial direction, another compression spring of the transaxial vibration-damping rubber portion in the axial direction can be used to allow the axial spring to be set harder. In addition, the axial load can be supported dispersedly to achieve improvement in durability.

A third mode of the present invention is the tank rubber cushion according to the first or second mode, wherein the transaxial vibration-damping rubber portions of the divided rubber cylinders are made with a constant thickness all along a periphery thereof.

According to the third mode, concentration of local stresses can be prevented along the periphery of the transaxial vibration-damping rubber portion. Therefore, flaws such as cracks generated in the transaxial vibration-damping rubber portion can be prevented to improve the durability thereof.

A fourth mode of the present invention is the tank rubber cushion according to any one of the first through third modes, wherein the transaxial vibration-damping rubber portions are made in a wavy form that consecutively changes the diameter in the circumferential direction.

According to the fourth mode, concentration of stresses at the formation of the concave/convex portion is avoided to distribute the forces dispersedly along the periphery because the concave/convex portion has a continuously changing diameter in the circumferential direction. Therefore, cracks and the like in the transaxial vibration-damping rubber portion are prevented to achieve improvement in durability thereof.

More specifically, as a fifth mode of the present invention, in the tank rubber cushion according to the fourth mode, the concave/convex portion of the transaxial vibration-damping rubber portion comprises a first wavy curved portion that is convex on an outside and a second wavy curved portion that is convex on an inside with continuously changing diameters in the circumferential direction, and the concave/convex portion is adapted to allow an assembly where an apex of the first wavy curved portion abuts against the inner periphery of the support portion along an outer periphery thereof with the gap existing between an inner periphery thereof and the outer periphery of the inner axial member, while an apex of the second wavy curved portion abuts against the outer periphery of the inner axial member along an inner periphery thereof with the gap existing between an outer periphery thereof and the inner periphery of the support portion.

According to the fifth mode, a gap is formed on the inner peripheral side between the tank rubber cushion under installation and the inner axial member at the apex of the first wavy curved portion, while a gap is formed with the support portion along the outer periphery at the apex of the second wavy curved portion. This achieves soft spring characteristics taking advantage of the shearing component of the transaxial vibration-damping rubber portion at the time of vibration input in the transaxial direction, thus effectively exerting the attenuation effects against the transmission of fuel flow noise.

A sixth mode of the present invention is the tank rubber cushion according to any one of the first through fifth modes, wherein a concave groove is formed in the axial vibration-damping rubber portion opening toward an axially inside surface thereof while extending along a base of the transaxial vibration-damping rubber portion on an outer peripheral side thereof in the circumferential direction.

According to the sixth mode, the free length of the rubber surface is secured at the base of the transaxial vibration-damping rubber portion, which prevents concentration of strains and stresses. That allows to achieve high durability of the transaxial vibration-damping rubber portion.

A seventh mode of the present invention is the tank rubber cushion according to any one of the first through sixth modes, wherein the two divided rubber cylinders are formed in a same shape as each other at least at the transaxial vibration-damping rubber portion.

According to the seventh mode, biased stress is prevented from acting on the transaxial vibration-damping rubber portion of one of the divided rubber cylinders, which achieves high durability of either of the divided rubber cylinders.

According to the present invention, a high spring constant is realized in the axial direction by the compression spring component of the axial vibration-damping rubber portion placed between the opposing surfaces of the flanges to effectively obtain a load bearing capacity and a displacement limiting action of the fuel tank and the like. Meanwhile, in the transaxial direction, a low spring constant is realized through the shearing spring component of the transaxial vibration-damping rubber portion by providing the concave/convex portion to the transaxial vibration-damping rubber portion interposed between the inner axial member and support portion, thus effectively exerting an attenuation effect against transmission of fuel flow noise.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
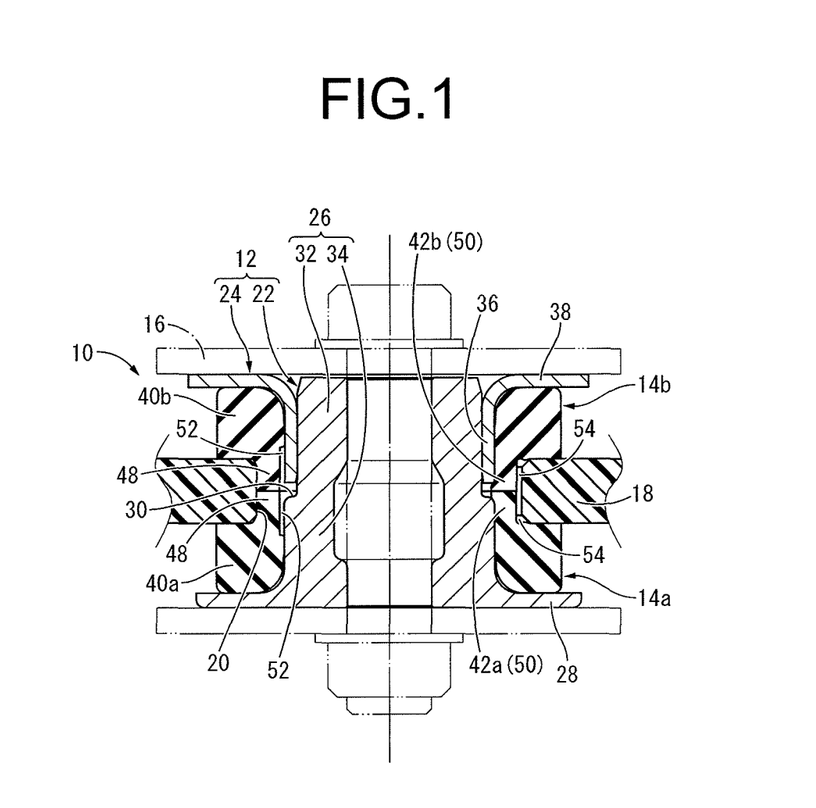
FIG. 1 is a longitudinal cross-sectional view of a tank rubber cushion under installation as one of the embodiments of the present invention, taken along line 3-3 of FIG. 2.

FIG. 1 shows a tank rubber cushion 10 to be used for supporting a vehicular fuel tank as one embodiment of the tank rubber cushion with a structure according to the present invention. The tank rubber cushion 10 has a structure where two divided rubber cylinders 14*a* and 14*b* are attached to an inner axial member 12. Then, the inner axial member 12 is directly fixed to a mounting piece 16 on the side of the vehicle body, and at the same time, inserted through a mounting hole 20 of a support portion 18 provided on the side of the fuel tank so that it is indirectly attached to the fuel tank via the two divided rubber cylinders 14*a* and 14*b*, thus allowing the fuel tank, not shown, to be supported by the vehicle body in a vibration-damping way. The fuel tank is supported via a plurality of tank rubber cushions 10 at multiple locations by the vehicle body. In the following descriptions, the vertical direction generally means an approximate up and down direction under installation of the tank rubber cushion 10 to the vehicle body in FIG. 1. Further, the horizontal direction generally means an approximate left and right direction under installation of the tank rubber cushion 10 to the vehicle body in FIG. 1.

More specifically, the inner axial member 12 is formed by a combination of a main body metal fitting 22 and a flange metal fitting 24 different from each other. The main body metal fitting 22 is made of a highly rigid member formed of metal materials such as iron and aluminum alloy or hard synthetic resin and the like, and is structured in such a way that a lower flange 28 protrudes outwards in the transaxial direction from the bottom end of a cylinder portion 26 which is in an approximate form of a cylinder. Also, a step 30 is formed along the outer periphery in the middle of the cylinder portion 26 in the axial direction, and the upper side of the step 30 in the cylinder portion 26 is made to be a small-diameter cylinder 32, whereas the lower side of the step 30 is made to be a large-diameter cylinder 34. In addition, the central hole of the cylinder portion 26 is partially made with a larger diameter at the middle in the axial direction. The cylinder portion 26 is made thicker than the lower flange 28 so that under installation to the vehicle body described later, enough strength is secured for mounting to the mounting piece 16 on the vehicle body side.

Meanwhile, the lower flange 28 is made thinner, thus achieving weight reduction of the assembly. Also, the top end of the cylinder portion 26 is gradually made smaller in diameter upwards which allows easier installation of the flange metal fitting 24 described later.

Meanwhile, the flange metal fitting 24 is a member in an annular form with a structure where an upper flange 38 protrudes outward in the transaxial direction from the top of a connection cylinder 36. The flange metal fitting 24 can be obtained by, although not limited to, forming the connection cylinder 36 along the inner periphery by press-working a thin metal plate in an approximate annular form, for example.

Then, by having the small-diameter cylinder 32 of the main body metal fitting 22 pressed into the connection cylinder 36 of the flange metal fitting 24 from below, the main body metal fitting 22 and the flange metal fitting 24 are connected and fixed to construct the inner axial member 12. In such inner axial member 12, the lower flange 28 and the upper flange 38 are provided at both ends in the axial direction to face each other in the axial direction at a certain distance. The step 30 of the main body metal fitting 22 and the bottom end of the connection cylinder 36 of the flange metal fitting 24 are separated in the axial direction so that a dimensional tolerance is provided between the main body metal fitting 22 and the flange metal fitting 24, thus preventing assembly failures.

This inner axial member 12 is inserted through the mounting hole 20 provided in the support portion 18, and the lower flange 28 is arranged below the support portion 18 to face it in the axial direction, while the upper flange 38 is arranged above the support portion 18 to face it in the axial direction. Also, the cylinder portion 26 and the connection cylinder 36 in the inner axial member 12 are formed with a smaller diameter than that of the mounting hole 20 of the support portion 18 so that the inner axial member 12 and the support portion 18 are separated from each other at a distance in the radial direction.

The divided rubber cylinder 14a is arranged between the support portion 18 and the lower flange 28, while the divided rubber cylinder 14b is arranged between the support portion 18 and the upper flange 38. These divided rubber cylinders 14a and 14b are in approximately the same form but upside down, and the divided rubber cylinder 14a is inserted onto the outer peripheral face of the main body metal fitting 22, while the divided rubber cylinder 14b is inserted onto the outer peripheral face of the flange metal fitting 24 to face each other in the axial direction.

Figure 2:
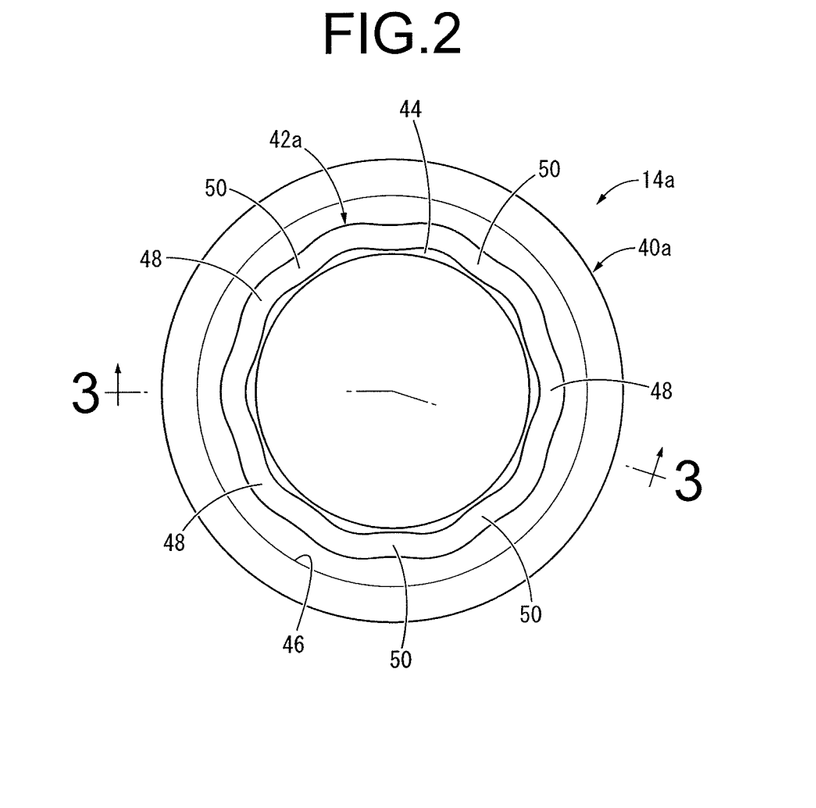
FIG. 2 is a plan of a divided rubber cylinder composing the tank rubber cushion shown in FIG. 1.
Figure 3:
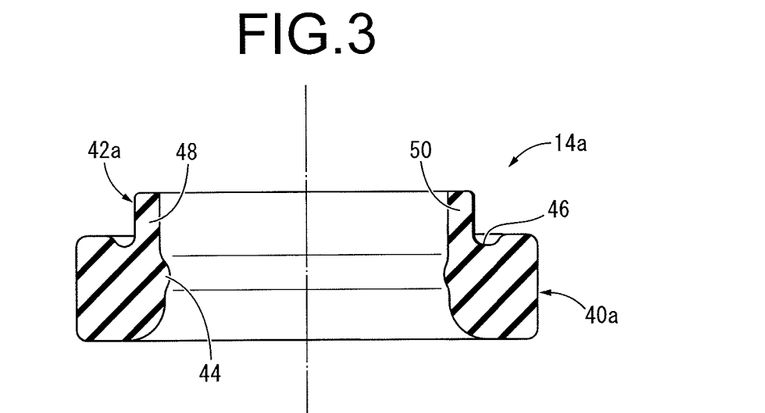
FIG. 3 is a cross-sectional view taken along line 3-3 of FIG. 2.

In other words, the divided rubber cylinders 14a, 14b are, as shown in FIGS. 2 and 3, made of a rubber elastic body in an approximate annular form as a whole. More specifically, the divided rubber cylinders 14a, 14b are integrally composed of axial vibration-damping rubber portions 40a, 40b in an approximate annular form constituting the outer side in the axial direction and transaxial vibration-damping rubber portions 42a, 42b in a cylinder form constituting the inner side in the axial direction. Specific structure of the divided rubber cylinder 14a will be described below in reference to FIGS. 2 and 3. Regarding the divided rubber cylinder 14b, since it is in approximately the same form as the divided rubber cylinder 14a but upside down, as mentioned above, detailed descriptions of the axial vibration-damping rubber portion 40b and transaxial vibration-damping rubber portion 42b will be omitted.

The axial vibration-damping rubber portion 40a of the divided rubber cylinder 14a is a rubber elastic body that extends in an annular form in the circumferential direction having enough thickness in the axial direction as well as relatively large thickness in the radial direction. Along the inner periphery of the axial vibration-damping rubber portion 40a, a lip 44 is integrally formed to protrude out to give an inward convex form in the transaxial direction. Moreover, a concave groove 46 opening upward is formed in the axial vibration-damping rubber portion 40a continuously extending in the circumferential direction. Then, the axial vibration-damping rubber portion 40a of the divided rubber cylinder 14a is arranged between the lower flange 28 and the support portion 18, while the axial vibration-damping rubber portion 40b of the divided rubber cylinder 14b is arrange between the upper flange 38 and the support portion 18.

The transaxial vibration-damping rubber portion 42a of the divided rubber cylinder 14a is a rubber elastic body in a cylindrical form protruding out toward inside from the inner periphery of the axial vibration-damping rubber portion 40a toward inside in the axial direction (upward from the divided rubber cylinder 14a), and integrally formed with the axial vibration-damping rubber portion 40a. The transaxial vibration-damping rubber portion 42a is made thinner in the radial direction compared to the axial vibration-damping rubber portion 40a, and is formed with less than half the thickness of the axial vibration-damping rubber portion 40a in the present embodiment. The transaxial vibration-damping rubber portion 42a is, as explained later, arranged to be inserted between the inner axial member 12 and the support portion 18 in the radial direction. The concave groove 46 of the axial vibration-damping rubber portion 40a is formed to extend along the base of the transaxial vibration-damping rubber portion 42a on the outer peripheral side in the circumferential direction, and the outer periphery of the transaxial vibration-damping rubber portion 42a smoothly transitions into the inner walls of the concave groove 46 without any step or bend.

Figure 4:
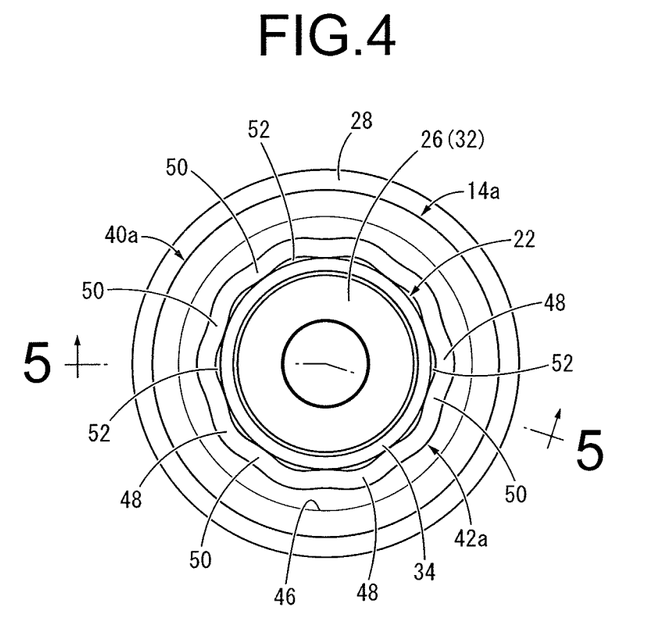
FIG. 4 is a plan showing the divided rubber cylinder shown in FIG. 2 under installation to a main body metal fitting.

The transaxial vibration-damping rubber portion 42a is made with its outer and inner diameters continuously varying in the circumferential direction and is made in a wavy form as shown by the plan in FIG. 4. More specifically, the transaxial vibration-damping rubber portion 42a is made with a structure alternately formed by a first wavy curved portion 48 that becomes convex outward and concave inward in the radial direction and a second wavy curved portion 50 that becomes concave outward and convex inward in the radial direction. In the present embodiment, ten first wavy curved portions 48 and ten second wavy curved portions 50 are integrally formed alternately in the circumferential direction in a smoothly continuous manner, and a concave/convex portion is formed by these first and second wavy curved portions 48 and 50.

In addition, the radial dimension, either the inner or outer diameter, of the transaxial vibration-damping rubber portion 42a varies continuously in the circumferential direction and the thickness t of the transaxial vibration-damping rubber portion 42a is made constant all along the periphery. The constant thickness t of the transaxial vibration-damping rubber portion 42a all along the periphery not only refers to a situation where the thickness is kept strictly constant but also to a situation where the thickness has certain variation within the range that can avoid excessive concentration of strains or stresses. More specifically, the thickness t of the transaxial vibration-damping rubber portion 42a should preferably be restricted to vary within a range of 10% along the periphery, in which case the thickness t of the transaxial vibration-damping rubber portion 42a is considered to be virtually constant.

Figure 5:
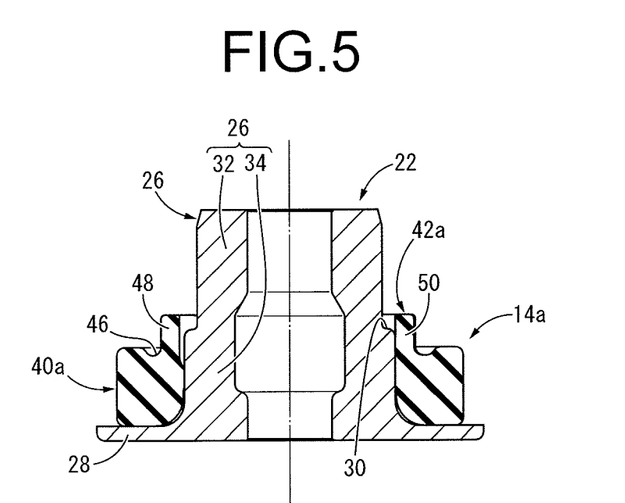
FIG. 5 is a cross-sectional view taken along line 5-5 of FIG. 4.

The divided rubber cylinder 14a provided with such a structure is attached to the main body metal fitting 22 of the inner axial member 12. That is, the cylinder portion 26 of the main body metal fitting 22 is inserted from below into the central hole of the divided rubber cylinder 14a in an approximate annular form as a whole, and the divided rubber cylinder 14a is inserted onto the outer peripheral face of the large-diameter cylinder 34 of the cylinder portion 26. This allows the divided rubber cylinder 14a to be installed being positioned against the large-diameter cylinder 34 of the main body metal fitting 22 in a non-adhesive way by its own elasticity (see FIGS. 4 and 5).

Figure 6:
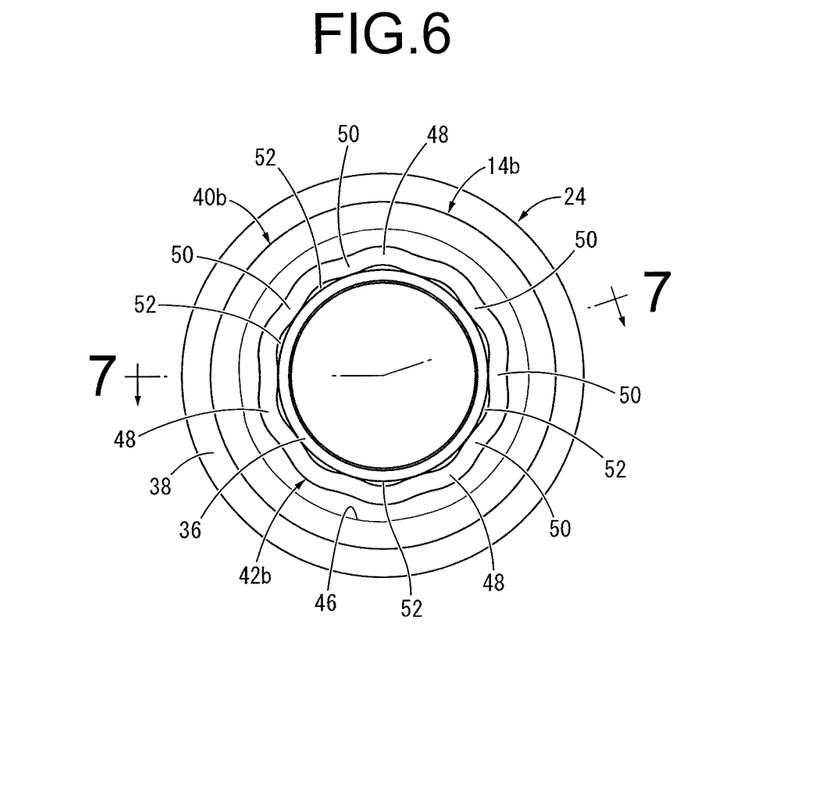
FIG. 6 is a bottom plan showing a divided rubber cylinder different from the one of FIG. 2 under installation to a flange metal fitting.
Figure 7:
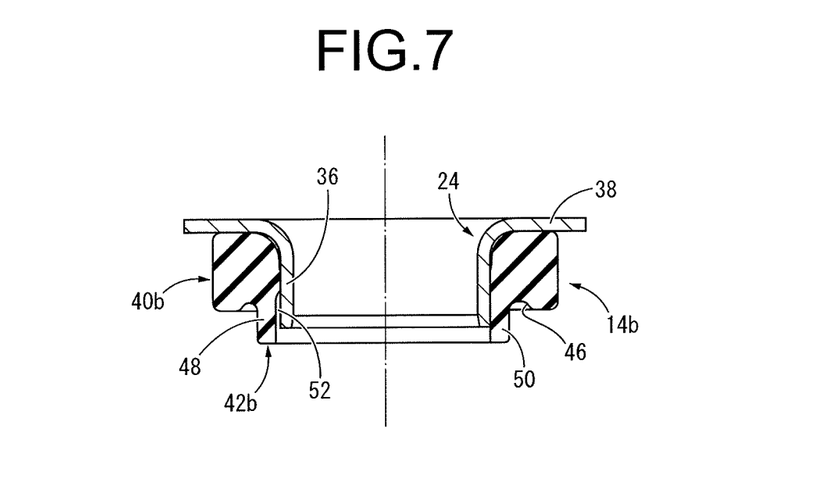
FIG. 7 is a cross sectional view taken along line 7-7 of FIG. 6.

Meanwhile, the divided rubber cylinder 14b is attached to the connection cylinder 36 of the flange metal fitting 24. In other words, the connection cylinder 36 of the flange metal fitting 24 is inserted from outside into the central hole of the divided rubber cylinder 14b made in an approximate annular form similar to that of the divided rubber cylinder 14a. This allows the divided rubber cylinder 14b to be installed being positioned against the connection cylinder 36 of the flange metal fitting 24 in a non-adhesive way by its own elasticity (see FIGS. 6 and 7).

Then, a tank rubber cushion 10 is formed by having the main body metal fitting 22 and the flange metal fitting 24 assembled to each other under installation of the divided rubber cylinders 14a and 14b. Also, the support portion 18 on the fuel tank side is interposed between the axial vibration-damping rubber portion 40a of the divided rubber cylinder 14a and the axial vibration-damping rubber portion 40b of the divided rubber cylinder 14b, and the transaxial vibration-damping rubber portions 42a and 42b of the divided rubber cylinders 14a and 14b are each inserted into the mounting hole 20 of the support portion 18. This allows the inner axial member 12 to be elastically attached to the support portion 18 via the divided rubber cylinders 14a and 14b. Moreover, the fuel tank is elastically supported by the vehicle body by having the inner axial member 12 fixed to the mounting piece 16 on the vehicle body side by bolts.

The axial vibration-damping rubber portions 40a and 40b of the divided rubber cylinders 14a and 14b are pushed against the support portion 18 from both side in the axial direction, which makes these axial vibration-damping rubber portions 40a and 40b pre-compressed in the axial direction. Then, the concave groove 46 formed in the divided rubber cylinders 14a and 14b almost disappears due to the deformation of the axial vibration-damping rubber portions 40a and 40b. Thus, strains and stresses imposed against the divided rubber cylinders 14a and 14b during the assembly process are attenuated by allowing the axial vibration-damping rubber portions 40a and 40b to swell out toward the inner periphery by the concave groove 46 in response to their compression deformation in the axial direction.

Further, the upper end surface of the transaxial vibration-damping rubber portion 42a of the divided rubber cylinder 14a and the lower end surface of the transaxial vibration-damping rubber portion 42b of the divided rubber cylinder 14b are abutted against each other in the axial direction, and these transaxial vibration-damping rubber portions 42a and 42b are pre-compressed in the axial direction.

Figure 8:
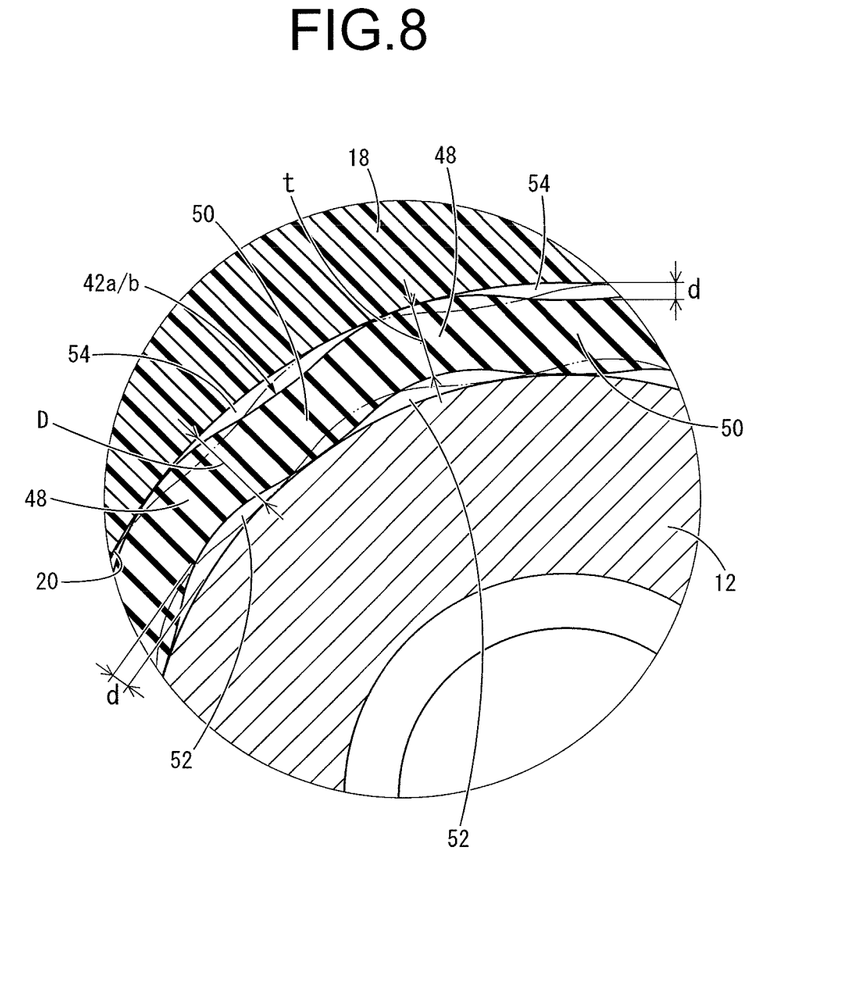
FIG. 8 is a magnified lateral cross-sectional view illustrating the main portion of the tank rubber cushion shown in FIG. 1 under installation to a vehicle body.

The abutting area between protruded end surfaces of the transaxial vibration-damping rubber portions 42a and 42b varies along the circumferential direction depending on the relative directions of the divided rubber cylinders 14a and 14b because the transaxial vibration-damping rubber portions 42a and 42b are made in a wavy form in the circumferential direction. In this situation, the minimum abutting area $S_{min}$ of the protruded end surfaces of the transaxial vibration-damping rubber portion 42a or 42b should preferably be set between 40% and 60% of the total area $S_{max}$ of the protruded end surface of the transaxial vibration-damping rubber portion 42a or 42b. This is because, if $S_{min}$ is set too small relative to $S_{max}$, there is a risk of unexpected release of the abutment of the transaxial vibration-damping rubber portions 42a and 42b due to damages or deformation thereof caused by concentration of stresses. On the contrary, if $S_{min}$ is set too large relative to $S_{max}$, the low spring characteristics can hardly be exerted enough in the transaxial direction due to insufficient sizes of gaps 52 and 54 described later. In the present embodiment, the abutting area $S_{min}$, when the two divided rubber cylinders 14a and 14b are revolved relative to each other by 9° in the circumferential direction, is set at about 50% of $S_{max}$. In other words, in the present embodiment, the abutting area of the transaxial vibration-damping rubber portions 42a and 42b is secured at no less than 50% of the maximum abutting area regardless of the relative position of the two divided rubber cylinders 14a and 14b in the circumferential direction. FIG. 8 shows in a two-dotted chain line the divided rubber cylinder 14b revolved by 9° in the circumferential direction relative to the divided rubber cylinder 14a.

Further, the total area of the protruded end surface $S_{max}$ of the transaxial vibration-damping rubber portion 42a or 42b should preferably be from 50% to 80% of the projected area $S_\mu$ it in the axial direction of the gap between the outer periphery of the inner axial member 12 and the inner periphery of the support portion 18. More preferably, $S_{max}$ should be set from 60% to 70% of $S\mu$. This is because, if $S_{max}$ is smaller than 50% of Sp, there is a risk that the thickness of the transaxial vibration-damping rubber portions 42a and 42b would be so small that one of the transaxial vibration-damping rubber portions 42a (42b) gets into the other transaxial vibration-damping rubber portion 42b (42a) when these are abutted against each other, generating an extremely large strain to be inputted to these transaxial vibration-damping rubber portions 42a and 42b. On the other hand, if $S_{max}$ is larger than 80% of $S\mu$, the gaps 52 and 54 are not wide enough and the low spring effect can hardly be exerted enough. In the present embodiment, $S_{max}$ is set at 66.5% of $S\mu$.

As shown in FIG. 8, the inner periphery of the first wavy curved portion 48 of the transaxial vibration-damping rubber portions 42a, 42b, at its apex, is away from the outer periphery of the inner axial member 12 by a given distance d, while the outer periphery thereof is overlapped with the inner periphery of the mounting hole 20 of the support portion 18 abutting against each other. This allows the transaxial vibration-damping rubber portions 42a, 42b, as shown in FIGS. 1 and 8, to be assembled to the inner axial member 12 and the support portion 18 with the gap 52 between the inner periphery of the first wavy curved portion 48 and the outer periphery of the inner axial member 12 on the inner peripheral side.

Meanwhile, the inner periphery of the second wavy curved portion 50 of the transaxial vibration-damping rubber portions 42a, 42b is, at its apex, overlapped with the outer periphery of the inner axial member 12 abutting against each other, while its outer periphery is separated away from the inner periphery of the mounting hole 20 of the support portion 18 by a given distance d. This allows the transaxial vibration-damping rubber portions 42a, 42b to be assembled to the inner axial member 12 and the support portion 18 under the condition where the gap 54 is provided on the outer peripheral side between the outer periphery of the second wavy curved portion 50 and the inner periphery of the support portion 18. The gaps 52 and 54 are shown larger than actual size for illustrative purposes in FIG. 1. In the present embodiment, the maximum dimension of the gap 52 on the inner peripheral side in the radial direction is made the same as the maximum dimension (d) of the gap 54 on the outer peripheral side, but they can be formed in different dimensions from each other.

In order to secure enough abutting area between the transaxial vibration-damping rubber portions 42a and 42b, the relation between the thickness t of the transaxial vibration-damping rubber portions 42a and 42b and the maximum dimension d of the gaps 52 and 54 in the radial direction with respect to the distance D between the inner axial member 12 and the support portion 18 in the radial direction should be set properly (for example, d<t<4d, and more preferably 1.5d<t<3d). This is because, if the thickness of the transaxial vibration-damping rubber portion 42a or 42b is too large, the low spring effect through the use of the shear spring component described later can hardly be exerted. On the other hand, if the maximum dimension d of the gap 52 or 54 in the radial direction is too large, the abutting area of the end surface of the transaxial vibration-damping rubber portions 42a or 42b gets too small to pose a risk of concentration of stresses at the abutment depending on the relative position between the two divided rubber cylinders 14a and 14b in the circumferential direction.

According to the tank rubber cushion 10 with a structure in conformity with such present embodiment, the axial vibration-damping rubber portions 40a, 40b of the divided rubber cylinders 14a, 14b are interposed between the upper and lower flanges 38, 28 and the support portion 18 in the axial direction. Therefore, due to the compression spring component of these axial vibration-damping rubber portions 40a, 40b, spring characteristics that are hard enough are achieved in the axial direction, resulting in greater load bearing capacity and vibration-damping performance.

Further, the axial vibration-damping rubber portions 40a, 40b are pre-compressed in the axial direction in between the opposing surfaces of the upper and lower flanges 38, 28 and the support portion 18. This allows the spring force of the axial vibration-damping rubber portions 40a, 40b in the compression direction to be set higher.

Moreover, the protruded end surfaces of the transaxial vibration-damping rubber portions 42a, 42b are abutted against each other and the transaxial vibration-damping rubber portions 42a, 42b are pre-compressed in the axial direction. This allows the compression spring component of the transaxial vibration-damping rubber portions 42a, 42b to be used in the axial direction as the spring component of the divided rubber cylinders 14a, 14b acting in the axial direction. This will further improve the load bearing capacity and high attenuation performance.

In addition, along each base of the transaxial vibration-damping rubber portions 42a, 42b on the outer peripheral side, the concave groove 46 is formed extending all around the periphery. This allows the swelling of the transaxial vibration-damping rubber portions 42a, 42b in the transaxial direction resulting from compression deformation thereof in the axial direction by deforming the divided rubber cylinders 14a, 14b so as to eliminate each concave groove 46. Therefore, effects of strains and stresses caused by assembly of the divided rubber cylinders 14a and 14b to each other are blocked to prevent degradation of durability thereof.

On the other hand, the transaxial vibration-damping rubber portions 42a, 42b are made in a thin cylinder form as well as in a wavy form with the first and second wavy curved portions 48 and 50 in the circumferential direction, and are provided with the gap 52 with the inner axial member 12 on the inner peripheral side as well as the gap 54 with the support portion 18 on the outer peripheral side under installation to the vehicle body. At the time of vibration input in the transaxial direction, with respect to the transaxial vibration-damping rubber portions 42a, 42b, the shear spring component acts prominently by having the first and second wavy curved portions 48 and 50 deformed to have small curvatures so as to restrict the spring constant in the transaxial direction.

If the vibration inputted in the transaxial direction has significantly large amplitudes, the transaxial vibration-damping rubber portions 42a, 42b get deformed until they fit along the outer periphery of the inner axial member 12 on one side of the vibration input direction, while they also get deformed until they fit along the inner periphery of the support portion 18 on the other side of the vibration input direction. As a result, the transaxial vibration-damping rubber portions 42a, 42b are compressed between the inner axial member 12 and support portion 18 to exert superior load bearing capacity, stopper and high attenuation effects and the like based on the compression spring component of the transaxial vibration-damping rubber portions 42a, 42b.

Moreover, an apex of the first wavy curved portion 48 is abutted against the inner periphery of the support portion 18, while an apex of the second wavy curved portion 50 is abutted against the outer periphery of the inner axial member 12. Therefore, the shear spring component of the transaxial vibration-damping rubber portions 42a, 42b can effectively exert its force making the most of the gaps 52 and 54, thus reducing the spring constant in the transaxial direction.

In addition, the transaxial vibration-damping rubber portions 42a and 42b have a structure where the first wavy curved portion 48 and second wavy curved portion 50 are continuously provided all along the periphery so that there is no need for highly accurate positioning in the circumferential direction, which makes assembly work easier. Especially, the abutting area of the end surfaces is secured large enough by means of properly setting the thickness t of the transaxial vibration-damping rubber portions 42a and 42b and the maximum dimension d of the gaps 52 and 54 regardless of the relative position of the transaxial vibration-damping rubber portions 42a and 42b in the circumferential direction. Therefore, the transaxial vibration-damping rubber portions 42a and 42b are abutted against each other in the axial direction without any positioning in the circumferential direction, which allows stable assembly thereof under intended conditions.

Also, the first wavy curved portion 48 and second wavy curved portion 50 are each made in a form that smoothly and continuously changes the diameter in the circumferential direction. Therefore, concentration of local strains and stresses is prevented in the transaxial vibration-damping rubber portions 42a and 42b to improve durability thereof. In addition, concentration of stresses due to differences in thickness can be prevented by the formation of the transaxial vibration-damping rubber portions 42a and 42b at a constant thickness all the way around, thus improving the durability thereof.

Also, in the tank rubber cushion 10, the two divided rubber cylinders 14a and 14b are formed in the same shape as each other and are arranged to face each other in an upside down position. Therefore, the divided rubber cylinders 14a and 14b can be obtained from a single-form rubber elastic body, which leads to reduction in metal molds and easier manufacturing. Further, since there is no difference in shape between the divided rubber cylinders 14a and 14b, any assembly error thereof can easily be prevented by simply paying attention to the direction of assembly.

An embodiment of the present invention has been described above, but the present invention is not limited to the one specifically described. For example, the two divided rubber cylinders 14a and 14b do not have to be in the same form but either or both of the sets in the axial vibration-damping rubber portion and transaxial vibration-damping rubber portion can be different in form from each other. In the two divided rubber cylinders 14a and 14b, it is desirable to have the transaxial vibration-damping rubber portions in the same shape as each other, which prevents concentrated action of strains and stresses on one of the transaxial vibration-damping rubber portions and allows to secure enough durability of the thinly made transaxial vibration-damping rubber portion.

In the embodiment described above, the transaxial vibration-damping rubber portions 42a, 42b have a structure where a plurality of the first wavy curved portions 48 and second wavy curved portions 50 constituting the concave/convex portion are formed continuously in the circumferential direction all the way around. However, the concave/convex portion can be provided partially along the periphery, and the effect of the present invention can be attained, for example, by means of forming the concave/convex portion on each side in one of the radial directions and aligning the radial direction in which the concave/convex portions are provided with the direction of the main vibration input in the transaxial direction. Additionally, as the concave/convex portion, one with angular concave and convex portions can be adopted instead of a smooth curvature formed by the continuous first and second wavy curved portions 48 and 50.

The present invention is applicable not only to cushions used for structures to support vehicular fuel tanks but also to tank rubber cushions that let fuel tanks be supported by the vehicular bodies of motorcycles and rail vehicles such as diesel locomotives, for example.

What is claimed is:

1. A tank rubber cushion for providing a vibration-damping support of a fuel tank at multiple locations against a vehicle body, comprising:

an inner axial member adapted to be fixed to one of the fuel tank and the vehicle body, the inner axial member having flanges at both ends in an axial direction, respectively, and the inner axial member being adapted to be inserted through a mounting hole formed in a support portion provided to another of the fuel tank and the vehicle body, with the flanges of the inner axial member being placed at and facing to both sides of the support portion in the axial direction;

two divided rubber cylinders inserted onto an outer peripheral face of the inner axial member while facing each other in the axial direction;

an axial vibration-damping rubber portion in an annular form being provided on an axially outside portion of each of the divided rubber cylinders, and being arranged between opposing surfaces of the flange of the inner axial member and the support portion in the axial direction;

a transaxial vibration-damping rubber portion in a cylinder form being provided to an axially inside portion of each of the divided rubber cylinders, and being thrust into the mounting hole of the support portion from both sides in the axial direction so as to be arranged between opposing surfaces of the inner axial member and the support portion in a transaxial direction, wherein the transaxial vibration-damping rubber portion of each divided rubber cylinder includes a concave/convex portion wherein a diameter varies in a circumferential direction so that an assembly is made with a gap between an outer periphery of the inner axial member and an inner periphery of the support portion along the concave/convex portion; and an outer wall of the transaxial vibration-damping rubber portion of each divided rubber cylinder is defined by a first alternating concave/convex surface and an inner wall of the transaxial vibration-damping rubber portion of each divided rubber cylinder is defined by a second alternating concave/convex surface, and a thickness between the first alternating concave/convex surface and the second alternating concave/convex surface, which thickness includes a thickness of the concave/convex portion in a diametrical direction, is constant in the circumferential direction.

2. The tank rubber cushion according to claim 1, wherein the transaxial vibration-damping rubber portions of the two divided rubber cylinders are abutted against each other at respective end surfaces in the axial direction.

3. The tank rubber cushion according to claim 1, wherein the transaxial vibration-damping rubber portions are made in a wavy form that consecutively changes the diameter in the circumferential direction.

4. The tank rubber cushion according to claim 3, wherein the concave/convex portion of each of the transaxial vibration-damping rubber portions comprises a first wavy curved portion that is convex on an outside and a second wavy curved portion that is convex on an inside with continuously changing diameters in the circumferential direction, and the concave/convex portion is adapted to allow an assembly where an apex of the first wavy curved portion abuts against the inner periphery of the support portion along an outer periphery thereof with the gap existing between an inner periphery thereof and the outer periphery of the inner axial member, while an apex of the second wavy curved portion abuts against the outer periphery of the inner axial member along an inner periphery thereof with the gap existing between an outer periphery thereof and the inner periphery of the support portion.

5. The tank rubber cushion according to claim 1, wherein a concave groove is formed in the axial vibration-damping rubber portion opening toward an axially inside surface thereof while extending along a base of each of the transaxial vibration-damping rubber portions on an outer peripheral side thereof in the circumferential direction.

6. The tank rubber cushion according to claim 1, wherein the two divided rubber cylinders are formed in a same shape as each other at least at each of the transaxial vibration-damping rubber portions.

7. The tank rubber cushion according to claim 1, wherein the gap is provided between a concave surface of the second alternating concave/convex surface and the outer periphery of the inner axial member and between a concave surface of the first alternating concave/convex surface and the inner periphery of the support portion, and abutting portions of a convex portion of the concave/convex portion that abuts the outer periphery of the inner axial member at the second alternating concave/convex surface are provided at different circumferential positions than the abutting portions of the convex portion of the concave/convex portion that abuts the inner periphery of the support portion at the first alternating concave/ convex surface such that the concave/convex portion of each of the transaxial vibration-damping rubber portions undergo shear deformation upon input of a vibrational load in an axis-perpendicular direction.

* * * * *